(12) United States Patent (10) Patent No.: US 9,122,464 B2
Sodhi et al. (45) Date of Patent: Sep. 1, 2015

(54) METHOD, APPARATUS, AND SYSTEM FOR ENERGY EFFICIENCY AND ENERGY CONSERVATION INCLUDING ENERGY EFFICIENT PROCESSOR THERMAL THROTTLING USING DEEP POWER DOWN MODE

(75) Inventors: Inder M. Sodhi, Folsom, CA (US); Efraim Rotem, Haifa (IL); Alon Naveh, Ramar Hasharon (IL); Sanjeev S. Jahagirdar, Folsom, CA (US); Varghese George, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 684 days.

(21) Appl. No.: 13/335,831

(22) Filed: Dec. 22, 2011

(65) Prior Publication Data

US 2012/0166839 A1 Jun. 28, 2012

(51) Int. Cl.
*G06F 1/00* (2006.01)
*G06F 1/20* (2006.01)
*G06F 1/32* (2006.01)

(52) U.S. Cl.
CPC .............. *G06F 1/206* (2013.01); *G06F 1/3206* (2013.01); *G06F 1/3287* (2013.01); *G06F 1/3293* (2013.01); *Y02B 60/121* (2013.01); *Y02B 60/1275* (2013.01); *Y02B 60/1282* (2013.01)

(58) Field of Classification Search
USPC .......................... 713/300, 310, 320, 322, 323
See application file for complete search history.

(56) References Cited

U.S. PATENT DOCUMENTS

| | | | |
|---|---|---|---|
| 6,219,723 B1 * | 4/2001 | Hetherington et al. | 710/18 |
| 6,363,490 B1 * | 3/2002 | Senyk | 713/300 |
| 7,664,970 B2 | 2/2010 | Jahagirdar et al. | |
| 7,880,284 B2 | 2/2011 | Zelikson et al. | |
| 7,917,787 B2 | 3/2011 | Jahagirdar et al. | |
| 7,953,993 B2 | 5/2011 | Allarey et al. | |
| 2003/0115013 A1 * | 6/2003 | Dendinger | 702/132 |
| 2005/0050373 A1 * | 3/2005 | Orenstien et al. | 713/320 |
| 2009/0177422 A1 * | 7/2009 | Cox et al. | 702/64 |
| 2013/0076381 A1 * | 3/2013 | Takayanagi et al. | 324/750.03 |

* cited by examiner

*Primary Examiner* — Zahid Choudhury
(74) *Attorney, Agent, or Firm* — Nicholson De Vos Webster & Elliott LLP

(57) ABSTRACT

Embodiments of the invention relate to energy efficient and conserving thermal throttling of electronic device processors using a zero voltage processor state. For example, a processor die may include a power control unit (PCU), and an execution unit having power gates and a thermal sensor. The PCU is attached to the thermal sensor to determine if a temperature of the execution unit has increased to greater than an upper threshold, such as while the execution unit is processing data in an active processor power state. The PCU is also attached to the power gates so that upon such detection, it can change the active processor power state to a zero processor power state to reduce the temperature of the execution unit. When the sensor detects that the temperature has decreased to less than a lower threshold, the PCU can change the processor power state back to the active state.

11 Claims, 14 Drawing Sheets

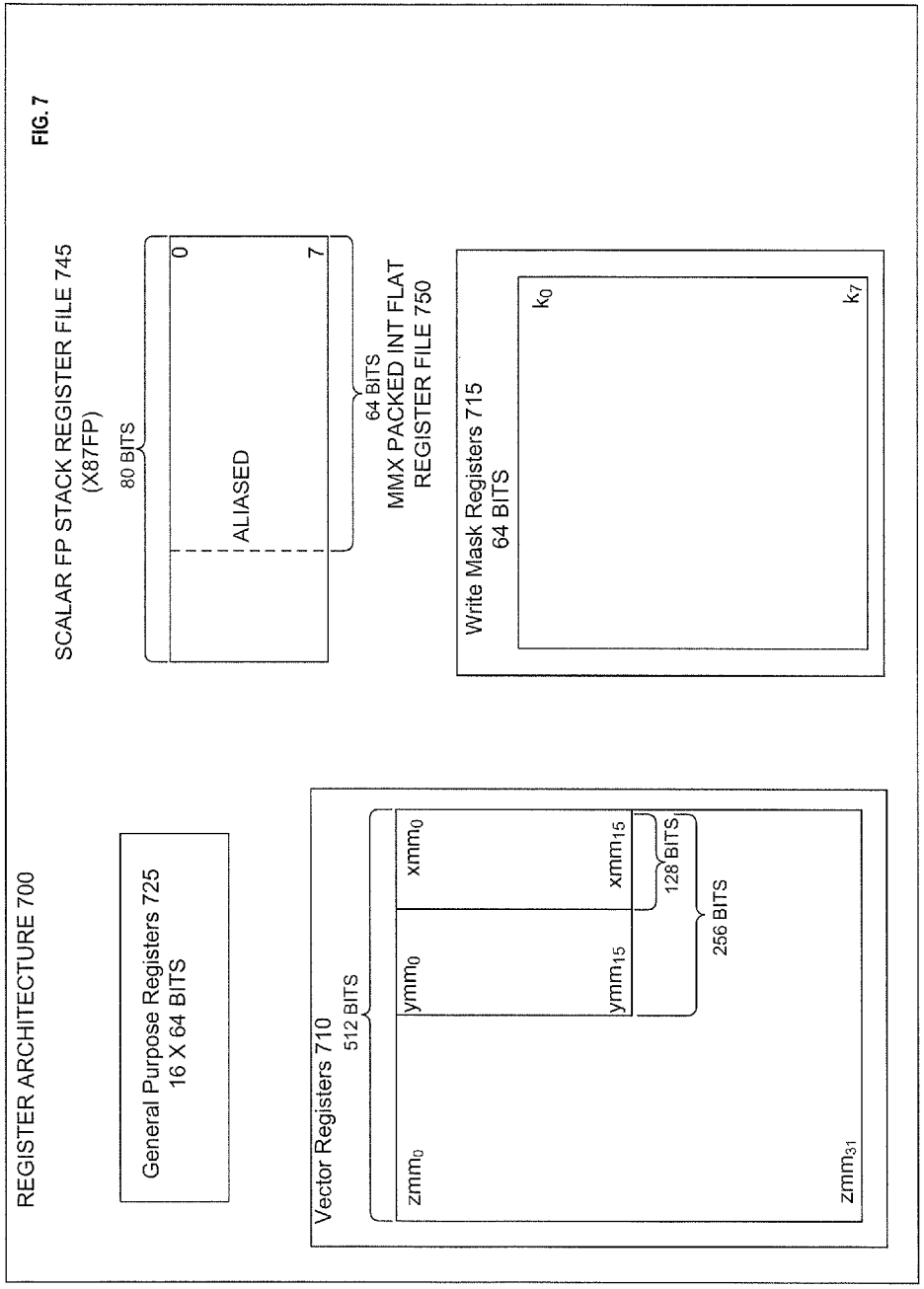

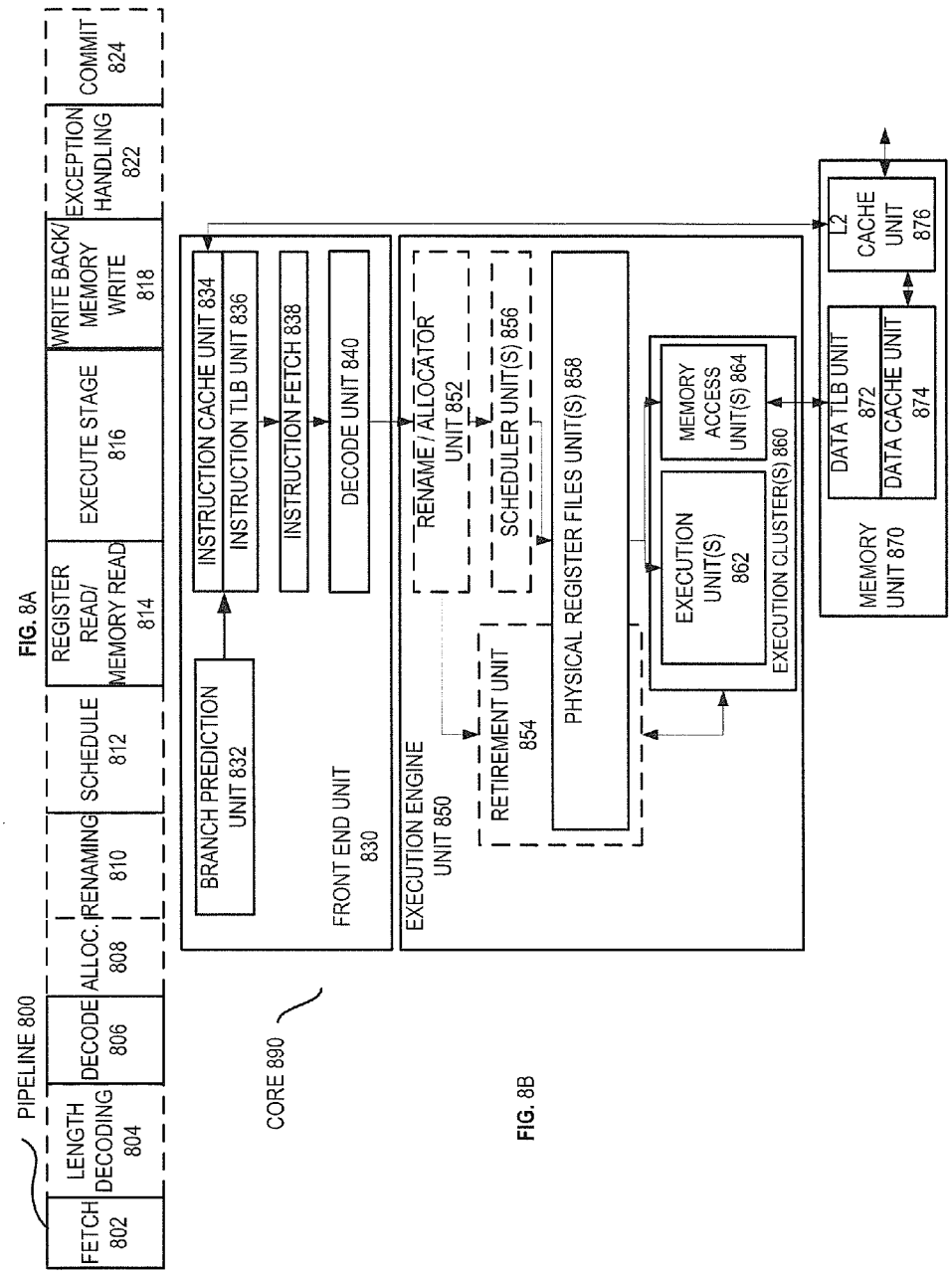

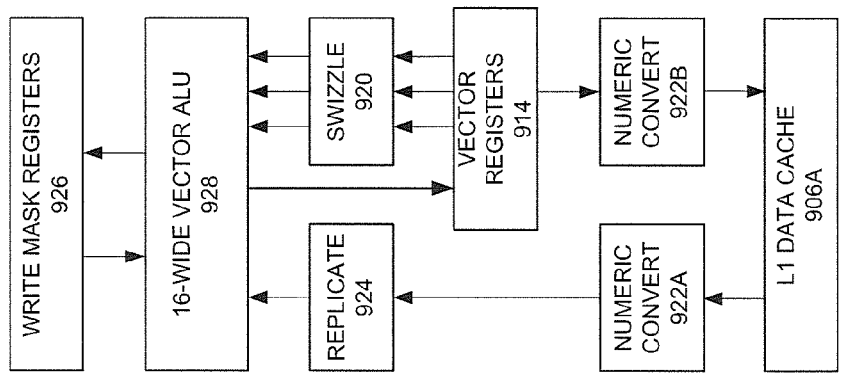
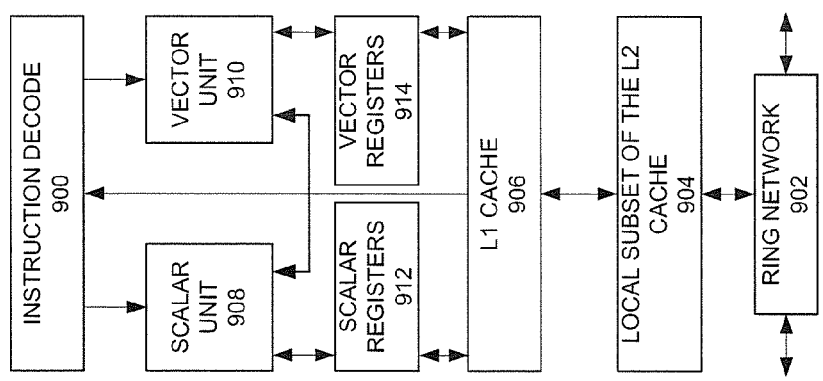

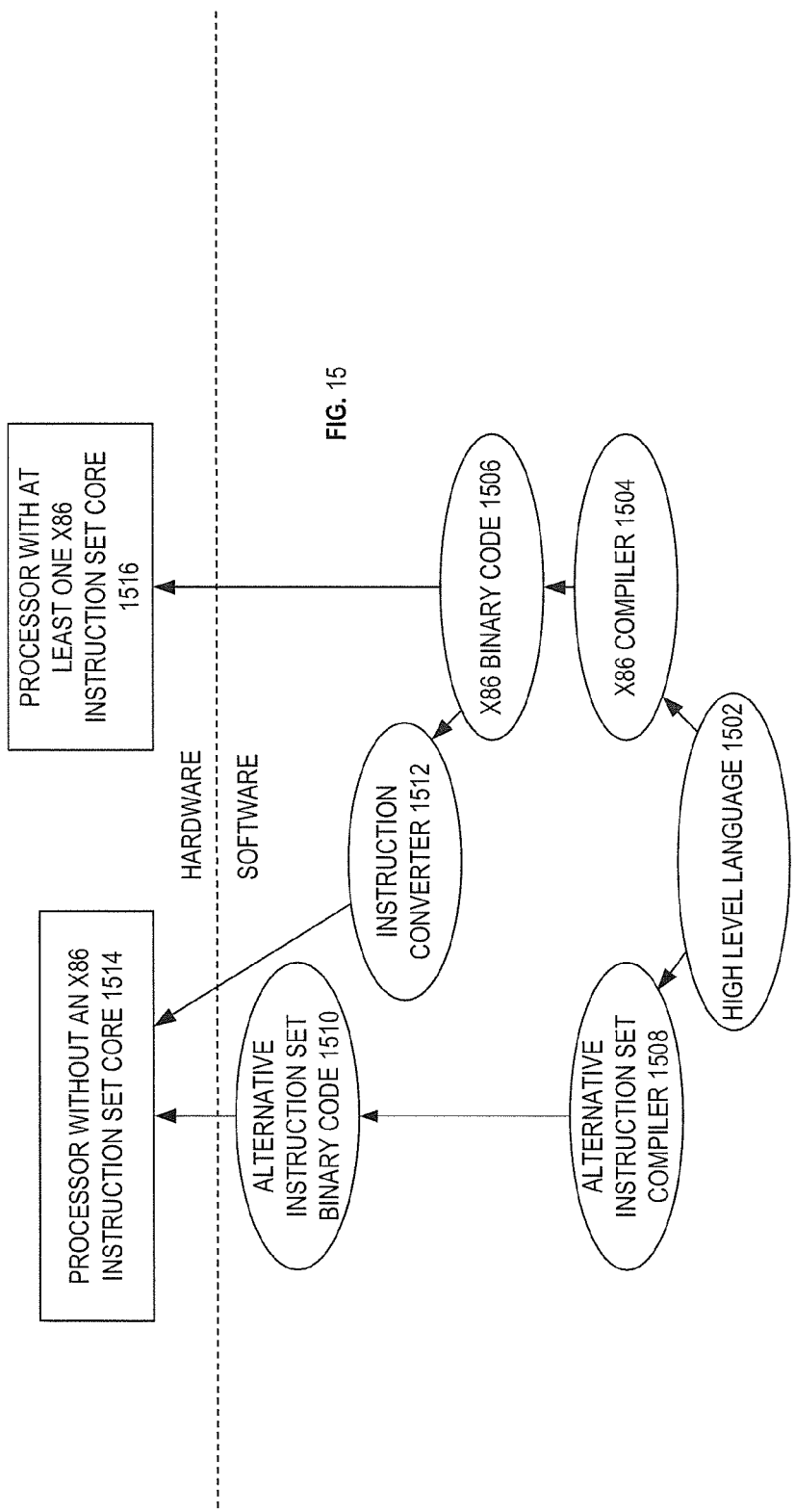

METHOD, APPARATUS, AND SYSTEM FOR ENERGY EFFICIENCY AND ENERGY CONSERVATION INCLUDING ENERGY EFFICIENT PROCESSOR THERMAL THROTTLING USING DEEP POWER DOWN MODE

FIELD

This disclosure pertains to energy efficiency and energy conservation in integrated circuits, as well as code to execute thereon, and in particular but not exclusively, to the field of thermal control of computing device processors. More particularly, embodiments of the invention relate to energy efficient and energy conserving thermal throttling of electronic device processors using deep power down mode.

BACKGROUND

Advances in semi-conductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, ultrabooks, tablets, mobile phones, processors, embedded systems, etc. become even more prevalent (from inclusion in the typical computer, automobiles, and televisions to biotechnology).

As the trend toward advanced microprocessors, e.g. central processing units (CPUs) or "processors", with more transistors and higher frequencies continues to grow, computer designers and manufacturers are often faced with corresponding increases in power and thermal consumption. Particularly in computing devices, processor power consumption can lead to overheating, which may negatively affect performance, damage components (e.g., the processor), cause discomfort or injury to the user, and can significantly reduce battery life.

Thus, thermal control continues to be an important issue for computing devices including desktop computers, servers, laptop computers, wireless handsets, cell phones, tablet computers, personal digital assistants, etc.

BRIEF DESCRIPTION OF THE DRAWINGS

FIG. 7 is a block diagram of a register architecture according to one embodiment of the invention.

FIG. 8A is a block diagram illustrating both an exemplary in-order pipeline and an exemplary register renaming, out-of-order issue/execution pipeline according to embodiments of the invention.

FIG. 8B is a block diagram illustrating both an exemplary embodiment of an in-order architecture core and an exemplary register renaming, out-of-order issue/execution architecture core to be included in a processor according to embodiments of the invention.

FIGS. 9A-B illustrate a block diagram of a more specific exemplary in-order core architecture, which core would be one of several logic blocks (including other cores of the same type and/or different types) in a chip.

FIG. 15 is a block diagram contrasting the use of a software instruction converter to convert binary instructions in a source instruction set to binary instructions in a target instruction set according to embodiments of the invention.

DETAILED DESCRIPTION

Figure 1:
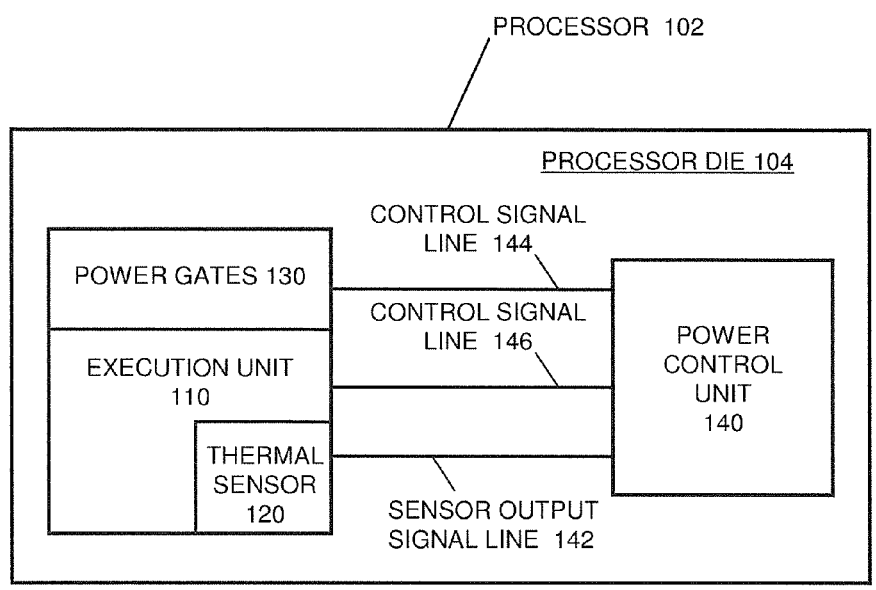
FIG. 1 is a block diagram of a processor that may be used to implement energy efficient thermal throttling of a processor using deep power down mode, according to some embodiments of the present invention.

In the following description, the various embodiments of the invention will be described in detail. However, such details are included to facilitate understanding of the embodiments of the invention and to describe exemplary embodiments for employing the embodiments of the invention. Such details should not be used to limit the embodiments of the invention to the particular embodiments described because other variations and embodiments are possible while staying within the scope of the embodiments of the invention. Furthermore, although numerous details are set forth in order to provide a thorough understanding of the embodiments of the invention, it will be apparent to one skilled in the art that these specific details are not required in order to practice the embodiments of the invention.

In the following description, particular components, circuits, state diagrams, software modules, systems, timings, etc. are described for purposes of illustration. It will be appreciated, however, that other embodiments are applicable to other types of components, circuits, state diagrams, software modules, systems, and/or timings, for example. Although the following embodiments are described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems. And may be also used in other devices, such as handheld devices, systems on a chip (SOC), and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

In computing devices, processor power consumption can lead to overheating, which may negatively affect performance, damage components (e.g., the processor and components thereof) and can significantly reduce battery life. Thus, processors typically have a limited or design maximum thermal threshold, above which continuing to run the processor of a device could quickly damage components. Also, mobile device chassis typically have a limited or design maximum thermal threshold, above which continuing to run the processor of a device could quickly cause the user discomfort or injury. As described for embodiments herein, these and other processor or chassis overheating concerns can be address by placing the processor (or components thereof) into lower power states to reduce temperature of the processor, and thus of computing device components and the device chassis. Such reduction may include reducing the processor power state to a deep power down mode, such as a zero voltage processor state (e.g., C6, "deep sleep" or "off" state) to provide more energy efficient and power conserving thermal throttling of the processor.

FIG. 1 is a block diagram of a processor that may be used to implement energy efficient thermal throttling of a processor using deep power down mode, according to some embodiments of the present invention. FIG. 1 shows processor 102 including processor die 104, execution unit 110, thermal sensor 120, power gates 130 and power control unit 140.

Thermal sensor 120 is shown coupled to execution unit 110. In some cases, sensor 120 is attached, formed, or mounted onto a surface (e.g., a top surface) of unit 110. It is also contemplated that sensor 120 may be formed or mounted within layers of unit 110. In some embodiments, sensor 120 is attached a Thermal "T" junction of unit 110. In some cases, sensor 120 is a DTS (Digital Thermal Sensor) that uses an Analog current sensing Circuit and an ADC (Analog to Digital converter) circuit for estimating the digital temperature readout of the Execution Unit (110). Sensor 120 may represent one or more temperature sensors attached to one or more locations on unit 110, such as noted above. Thermal sensor 120 is coupled to power control unit 140 by sensor output signal line 142. Line 142 may represent one or more temperature signals (e.g., digital signals estimating the digital temperature readout of the Execution Unit (110)) sent to unit 140 using one or more signal lines.

Power gates 130 are shown coupled to execution unit 110. These gates may be described as embedded power gates in the core (e.g., on die 104 with and attached directly to unit 110). In some cases, gates 130 include circuitry and voltage (e.g., ground planes and power planes) attached, formed, or mounted onto surfaces (e.g., a inside surfaces) of unit 110. The planes of gates 130 may be attached to power leads or contacts of unit 110. According to some embodiments, gates 130 are switch capacitor circuits that are used for power plane isolation (power gating) of digital circuits. They operate in normal (voltage=Vcc) mode; or they operate in high resistance (voltage=Vcc/10) mode, thereby reducing the leakage power of the unit under control (e.g., unit 110). Some descriptions herein of unit 110 consider that gates 130 are included in or as a part of the circuitry of unit 110. Power control unit 140 is coupled to unit 110 (e.g., gates 130) by V/F control signal line 144. Line 144 may represent one or more control signals (e.g., digital "C" and "P" processor state or mode command signals as noted below) sent to gates 130 using one or more signal lines.

Power control unit 140 is also coupled to unit 110 by logic control signal line 146. Line 146 may represent one or more logic control signals (e.g., digital "C" and "P" processor state or mode command signals as noted below) sent to unit 110 using one or more signal lines.

Execution unit 110, thermal sensor 120, power gates 130 and power control unit 140 may be formed on or in processor die 104 as known in the art. In some cases, power gates 130 and sensor 120 may be described as coupled between execution unit 110 and power control unit 140. In some cases, processor die 104 is a single die or "chip". In other cases, processor die 104 represents two or more die or "chips".

Execution unit 110 is configured to process data for an operating system running on or using unit 110 for processing. Execution unit 110 is also configured to process data for one or more applications (e.g., software applications) running on the operating system. Unit 110 may include hardware, circuitry, components and/or logic necessary for such processing. In addition, such processing may include using hardware, circuitry, components and/or logic in addition to unit 110.

Power control unit 140 may be configured to control the operating voltage of the processor (e.g., by controlling gates 130). Unit 140 may include hardware logic and/or BIOS configured to perform such control. In some cases, unit 140 includes hardware, hardware logic, memory, integrated circuitry, programmable gate arrays, controllers, buffers, flip-flops, registers, state machines, FPGAs, PLDs, active devices (e.g., transistors, etc.), passive devices (e.g., inductors, capacitors, resistors, etc.), and/or other circuit elements to perform energy efficient and power conserving thermal throttling of a processor using deep power down mode, according to embodiments of the present invention.

Thermal sensor 120 may be configured to detect that a temperature of execution unit 110. It can detect that the temperature has increased to greater than a first threshold (e.g., see TH1 herein), while the execution unit is performing processing of data in an active processor power state. Unit 140 may receive the detection on sensor output signal line 142, such as by receiving a temperature signal sent by sensor 120 to unit 140 (e.g., on line142) and determining at unit 140 that the received signal indicates a temperature of greater than the first threshold. Upon or based on receiving that signal, power control unit 140 may be configured to (e.g., based on detecting the temperature is greater than the first threshold), change (e.g., by sending a control signal on line 144) a processor power state of execution unit 110 from the active processor power state to a zero processor power state, to reduce the temperature of execution unit 110.

According to some embodiments, the first threshold (e.g., TH1) may be predetermined (e.g., predetermined during design of the processor) based on a thermal design of a device into which the processor and execution unit is installed. According to some embodiments, such design may take into consideration a type of device (e.g., certain manufacturer and model of mobile phone, desktop computer, laptop computer and chassis thereof) into which the processor and execution unit is to be installed. It may be a threshold above which continuing to run the processor of a device could negatively affect performance, damage components (e.g., the processor and components thereof) and/or above which continuing to run the processor of a device could cause the user discomfort or injury.

According to some embodiments, thermal sensor 120 is also configured to, after changing the processor power state from the active processor power state to the zero processor power state, subsequently detect that a temperature of execution unit 110 has decreased to less than a second threshold, wherein the second threshold is lower than the first threshold. Unit 140 may receive the detection on sensor output signal line 142, such as by receiving a temperature signal sent by sensor 120 to unit 140 (e.g., on line142) and determining at unit 140 that the received signal indicates a temperature of less than the second threshold (e.g., see TH2 herein). Upon or based on receiving that signal, power control unit 140 may be configured to, (e.g., based on detecting the temperature is less than the second threshold) change (e.g., by sending a control signal on line 144) a processor power state of execution unit 110 from the zero processor power state to an active processor power state, to cause execution unit 110 to process data.

In some cases, the second threshold (e.g., TH2) may be predetermined based on causing a time period of the zero processor power state to have a predetermined proportional relationship with a time period of the active processor power state. It is appreciated that threshold TH2 may be determined based on an efficient proportionality between an amount of time a processor spends in a P0 state and an amount of time the processor spends in a zero processor power state (e.g., C6 state), during a period of time, such as based on testing data during design of the processor.

In some embodiments, the sleep logic may reside in unit 140, which sends a zero state and then ramp up voltage instructions to gates 130 (e.g., via line 144), and may also send a logical zero state and then logical ramp up voltage instructions to unit 110 (e.g., via line 146). For example, unit 140 may include zero voltage entry/exit logic and clock/power management logic of processor 102 (e.g., unit 110 and gates 130).

In response to receiving a request to enter a zero voltage power management state (e.g., zero processor power state, such as when the processor temperature is greater than TH1), zero voltage entry/exit logic of unit 140 may send an entry/exit control signal to unit 110 (e.g., via line 146) which causes unit 110 (e.g., upon receipt thereof) to Halt cleanly and stop processing, such as including finishing external tasks. This may be referred to as a "logical halt." Such an entry/exit logic signal may include a "Go_C6" signal (which is like a DPSLP signal, such as a signal that changes or sets a logical zero power state, or logical C6 state).

Then, also in response to receiving the request to enter a zero voltage power management state, clock/power management logic of unit 140 may reduce the reference operating voltage of the processor to zero voltage and frequency. Here, zero voltage clock/power management logic of unit 140 may send a clock/power management control signal to gates 130 (e.g., via line 144) which causes gates 130 (e.g., upon receipt thereof) to reduce to zero the operating voltage and clock frequency available to unit 110 (e.g., takes out the voltage from the "halted" processing unit). This may be referred to as a "power halt." Such a voltage clock/power management logic signal may include an "EPG_Enable" signal (e.g., a signal that changes or sets (e.g. "does") the Electrical-power gating to zero power state, or power C6 state).

In some embodiments, a zero voltage power management state, when implemented in conjunction with ACPI standards, may be referred to as the C6 state. In some embodiments it may be referred to as including the C5 and C6 states. This may include any power state where the voltage goes below retention (C5), all the way to 0 (C6).

Subsequently, (e.g., when the processor temperature is less than TH2) in response to receiving a request to exit the zero voltage power management state, zero voltage power management logic of unit 140 may send a wake power management control signal to unit 110 (e.g., via line 146) which causes unit 110 (e.g., upon receipt thereof) to Enables power to the module (e.g., unit 110). This may be referred to as a "power wake." Such a voltage clock/power management logic signal may include an "EPG_Disable" signal (e.g., a signal that changes or sets the Electrical-power gating to active power state, or power C0 state).

Then, in response to receiving the request to exit the zero voltage power management state, zero voltage entry/exit logic of unit 140 may send an entry/exit control signal to unit 110 (e.g., via line 146) which causes unit 110 (e.g., upon receipt thereof) to WAKE and start processing, such as including external tasks. This may be referred to as a "logical wake." Such an entry/exit logic signal may include a "Go_C0" signal (e.g., which is like a WAKE signal, such as a signal that changes or sets a logical active power state, or logical C0-05 state).

In some embodiments, an active or non-zero voltage power management state, when implemented in conjunction with ACPI standards, may be referred to as the C0 state. In some embodiments it may be referred to as including the C0-C4 or the C0-05 states. In some cases, an active power state includes any power state other than where the voltage goes below retention (C5), all the way to 0 (C6).

Figure 2:
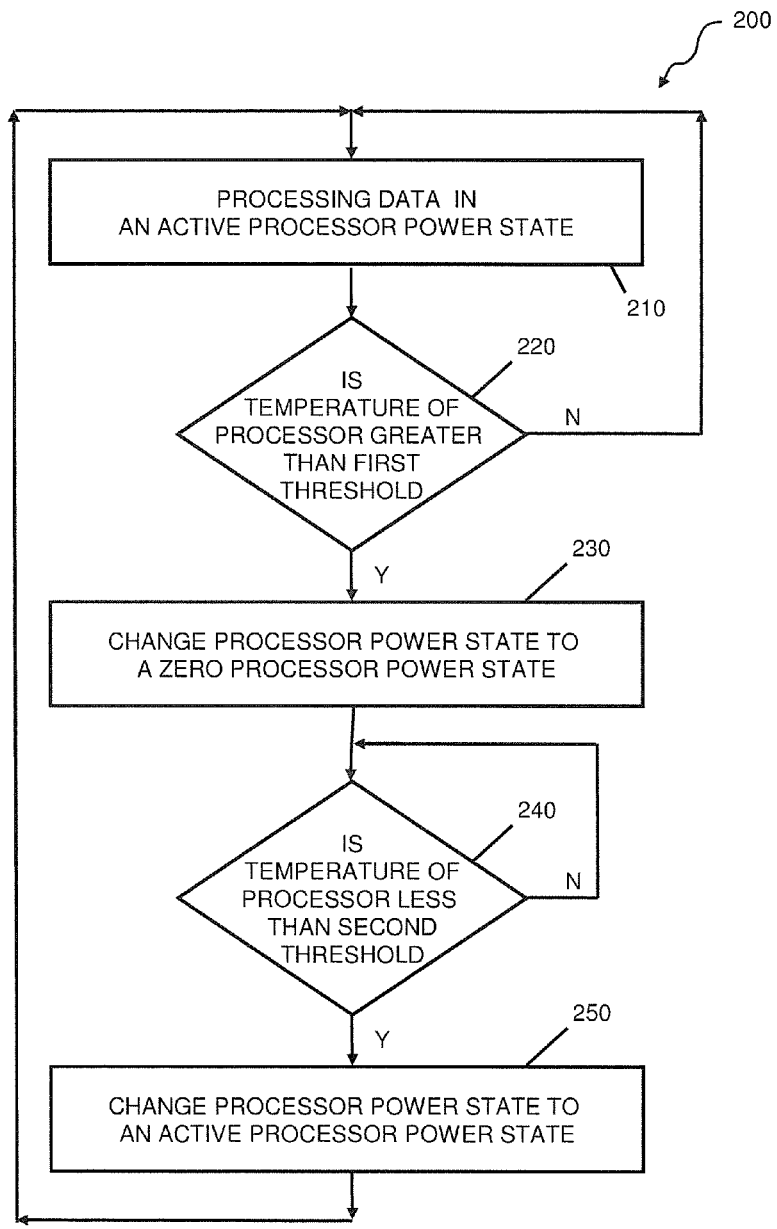
FIG. 2 is a flow diagram of a process that may be used to implement energy efficient thermal throttling of a processor using deep power down mode, according to some embodiments of the present invention.

FIG. 2 is a flow diagram of a process 200 that may be used to implement energy efficient thermal throttling of a processor using deep power down mode, according to some embodiments of the present invention. Process 200 may be performed by hardware circuitry of processor 102 and may be controlled by circuitry of control unit 140.

At block 210 a processor (e.g., processor 102 or execution unit 110) is performing processing of data in an active processor power state. Block 210 may describe a processor executing data for an operating system, and optionally also for one or more applications (e.g., software applications) running on that operating system.

At decision block 220 it is determined whether a temperature of the processor is greater than a first threshold (e.g., see TH1). If the temperature is not greater than a first threshold, processing returns to block 210. If the temperature is greater than a first threshold, processing continues to block 230. Block 220 may include thermal sensor 120 monitoring the temperature of unit 110 and sending continuous or periodic temperature data signals on line 142 to unit 140; and unit 140 detecting that a temperature of execution unit 110 has increased to (or is) greater than the first threshold (thus continuing the process to block 230). For instance, thermal sensor 120 may detect a temperature of the processor over a period of time, and unit 140 may determine, based on the thermal sensor reading, that the temperature of the processor has increased to greater than the first threshold. While the temperature has not increased to (or is not) greater than the first threshold, the current processor C and P state may be maintained or otherwise controlled by unit 140, or otherwise (e.g., by operating system and other hardware) (thus returning the process to block 210).

At block 230 the processor power state of the processor is changed from the active processor power state to a zero processor power state. The change may be performed in order to reduce the temperature of processor, and may occur regardless of any battery, power or processing requirements or priorities of the computing device or of the processor that attempt to or that would otherwise return the processor to a higher (e.g., C5–C0) state. The change may be required only due to avoiding overheating of the processor or the device. Block 230 may describe that upon or based on receiving the temperature data signals on line 142 from sensor 120 indicating a detected temperature greater than the first threshold, power control unit 140 changes a processor power state of the processor from the active processor power state to a zero processor power state, to reduce the temperature of the processor.

At decision block 240 it is determined whether a temperature of the processor is less than a second threshold (e.g., see TH2, which is lower than the first threshold). If the temperature is not less than a second threshold, processing returns to block 240. If the temperature is less than a second threshold, processing continues to block 250. Block 240 may include thermal sensor 120 monitoring the temperature of unit 110 and sending continuous or periodic temperature data signals on line 142 to unit 140; and unit 140 detecting that a temperature of execution unit 110 has decreased to (or is) less than the second threshold (thus continuing the process to block 250). While the temperature has not decreased to (or is not) less than the second threshold, the current processor C6 state may be maintained (thus returning process 200 to block 240), regardless of any control signals by operating system or other hardware that attempt to or that would otherwise return the processor to a higher (e.g., C5–C0) state.

At block 250 the processor power state of the processor is changed from the zero processor power state to an active processor power state. The change may be performed in order to allow the processor to return to processing data (as controlled by battery, power or processing requirements or priorities of the computing device or of the processor) for at least a known period of time, without increasing the processor temperature to above the first threshold. The change may be required only due to cooling of the processor or the device. Block 250 may describe that upon or based on receiving the temperature data signals on line 142 from sensor 120 indicating a detected temperature less than the second threshold, power control unit 140 changes a processor power state of the processor from the zero processor power state to a active processor power state, to cause execution unit 110 to process data.

After block 250, processing returns to block 210 to allow the processor to return to processing data.

Additional Descriptions of Processor "C" and "P" States

According to embodiments, processor 102 (e.g., Execution unit 110) may be put into (e.g., changed to) various processor "C" states (e.g., CPU states or operating states), such as depending on processing, power and thermal requirements. For one approach, an operating system may support a built-in power management software interface such as Advanced Configuration and Power Interface (ACPI) specification (for example, ACPI Specification, Revision 4.0a, published on Apr. 5, 2010 . . . Rev. 3.0, Sep. 2, 2004; Rev. 2.0c, Aug. 25, 2003; Rev. 2.0, Jul. 27, 2000, etc.). ACPI describes a power management policy including various "C states" that may be supported by processors and/or chipsets. For this policy, C0 is defined as the Run Time state in which the processor operates at high voltage and high frequency. C1 is defined as the Auto HALT state in which the core clock is stopped internally. C2 is defined as the Stop Clock state in which the core clock is stopped externally. C3 is defined as a Deep Sleep state in which all processor clocks are shut down, and C4 is defined as a Deeper Sleep state in which all processor clocks are stopped and the processor voltage is reduced to a lower data retention point. C5 is a Deeper Sleep state in which the processor voltage is reduced to near zero, but some components remain powered so the computer can "wake" from input from the keyboard, clock, modem, LAN, or USB device. C6 is a Deeper Sleep state known as the zero, near zero, or voltage sleep state. It may also be described as the "deep sleep" or "off" state. According to embodiments C6 is a known as the "zero power state" or zero voltage sleep state of Processor 102 (e.g., Execution unit 110). Putting the processor in the C6 state may be described as turning the processor completely off. C6 is described further herein. In some embodiments the deep power down, deep sleep, off or zero processor power state may include the C5 and C6 states.

Processor 102 (e.g., Execution unit 110) may also be put into (e.g., changed to) various power "P" states (e.g., performance states during C0 state), such as depending on processing, power and thermal requirements. These states may also be operating system supported based on an ACPI built-in power management software interface. These states may be implementation-dependent, where P0 is the highest-performance state, with P1 to Pn being successively lower-performance states, up to an implementation-specific limit of n (typically no greater than 16).

In some cases, P0 is a maximum power and frequency for the processor (e.g., resulting from unit 140 sending a control signal to unit 110, such as via line 144 to gates 130). P1 may be less than P0, by having voltage/frequency scaled down, such as to a Thermal Design Point at which the processor is designed to operate for extended periods of time without overheating (e.g., exceeding a temperature threshold of the processor, such as read by sensor 120, where the threshold is selected to avoid or prohibit negatively affecting performance, damaging components, or reducing battery life). Pn may be less than P1, by having voltage/frequency scaled down, such as to a Thermal Throttle Point at which the processor is designed to operate for a period of time without overheating. In some cases, Thermal Throttle Point is selected (e.g., predetermined during design of the processor) so that the processor operates, while reducing the temperature of the processor (e.g., until it is below a temperature threshold of the processor, such as read by sensor 120, where the threshold is selected to allow the processor to return to a higher P state for processing of data).

Additional Descriptions of "Active" and "Zero" Power States

Processor 102 (e.g., Execution unit 110) may be put into or removed from any of the above C or P states as a result of unit 140 sending a control signal to unit 110 (e.g., via line 144 to gates 130). The C and P states generally have different entry/exit latencies and power savings.

In some embodiments, processor 102 (e.g., Execution unit 110) may be put into the C6 state as a result of unit 140 sending a C6 control signal to unit 110 (e.g., via line 144 to gates 130) to change the current C or P state to the C6 state. This may occur when the temperature of the processor has increased to and is above the first threshold. In some cases, changing, altering, transitioning or moving a processor power state to a "zero processor power state" may be described by putting processor 102 (e.g., Execution unit 110) into the C6 state (e.g., such as from an "active processor power state" as noted herein). In some embodiments the C6 state described above in this paragraph may include the C5 and C6 states, such as where a zero processor power state includes the C5 and C6 states.

In some embodiments, processor 102 (e.g., Execution unit 110) may be removed (e.g., waken) from the C6 state as a result of unit 140 sending a different P or C control signal (e.g., via line 144 to gates 130) to unit 110 to change the C6 state to a different C or P state (such as an "active processor power state"). This may occur when the temperature of the processor has decreased to and is below the second threshold. In some cases, changing, altering, transitioning or moving a processor power state to an "active processor power state" may be described by putting processor 102 (e.g., Execution unit 110) into a C and/or P state in which the processor is processing or executing data for an operating system, and optionally also for one or more applications running on that operating system (e.g., such as from a "zero processor power state". For instance, an active processor power state describes that execution unit 110 is operational (e.g., C0 state) and performs processing of data (e.g., Pn-P0 state) for an operating system and for an application running on that operating system. In some cases, an active processor power state describes that execution unit 110 is in a P-state that is equal to or above the thermal design point (e.g., P1) of the processor. In some embodiments, an active processor power state describes that execution unit 110 is in a non-C6 state (e.g., C0-C5 state) and not processing data (e.g., not in Pn-P0 state), however the temperature of the processor is decreasing more slowly than when the processor is in the C6 state. In some embodiments the C6 state described above in this paragraph may include the C5 and C6 states, such as where a zero processor power state includes the C5 and C6 states.

Figure 3:
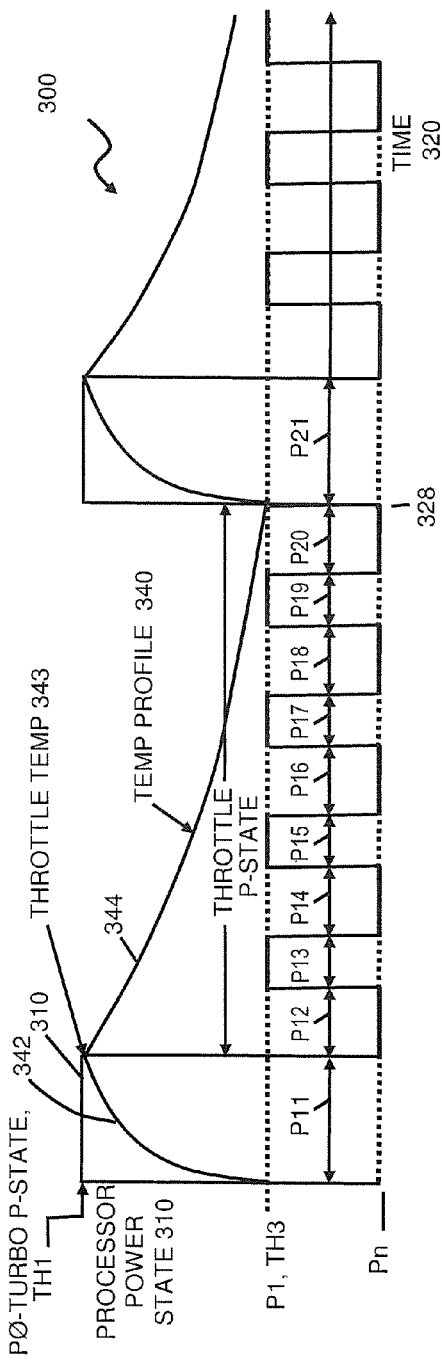
FIG. 3 is processor power state and temperature profile graph that may be used to implement energy efficient thermal throttling of a processor, according to some embodiments of the present invention.

FIG. 3 is processor power state and temperature profile graph that may be used to implement energy efficient thermal throttling of a processor, according to some embodiments of the present invention. FIG. 3 shows graph 300 plotting processor power state 310 and temperature profile 340 with respect to time 320. Temperature profile 340 may be a temperature of processor 102 or unit 110 as detected by sensor 120 and compared to thermal thresholds by unit 140.

At the beginning of time period P11, processor power state 310 is at P0 or a Turbo P-state (e.g., and the processor is at C0) and temperature profile 340 is at increasing curve 342. In some cases, Period P1 may represent any non-throttle P and C state where the temperature of the processor is increasing, such as due to processing of data.

At the end of time period P11, temperature profile 340 has increased to (and is at or above) Throttle Temp 343. As a result, the processor (e.g., processor 102 or execution unit 110) is put into a Throttle P-State 314 in which the processor power state 310 is decreased. During the throttle P-state the processor power state is decreased to Pn and may alternate between Pn and P1 until the processor temperature is reduced to threshold TH3. FIG. 3 shows processor power state 310 alternating during periods P12-P20, while temperature profile 340 is at decreasing curve 344, until it decreases to (and is at or below) threshold TH3 at the end of period P20. At the end of period P20, period P21 begins and the processor power state 310 and temperature profile 340 return to where they were at the beginning of period P11 and the plot repeats itself. Period P11-P21 may represent a period of time between 5 and 50 milliseconds. In some cases, period P11-P21 may represent a period of time between 10 and 30 milliseconds. In some cases, period P11-P21 may represent a period of time of 10 milliseconds. In some cases, throttle Temp 343 may be the same as threshold TH1.

Threshold TH3 may be the same as TH2, or may be predetermined based on the same factors as TH2, but considering Throttle P-State 314 and temperature profile 340. In some cases, threshold TH3 may be predetermined based on causing a time period of the throttle processor power state to have a predetermined proportional relationship with a time period of the active or P0 processor power state. For example, the proportional relationship may be for the processor to be in the P0 state for 30 milliseconds of time period P11-P21, and in the throttle P-state for 60 milliseconds of time period P11-P21.

Figure 4:
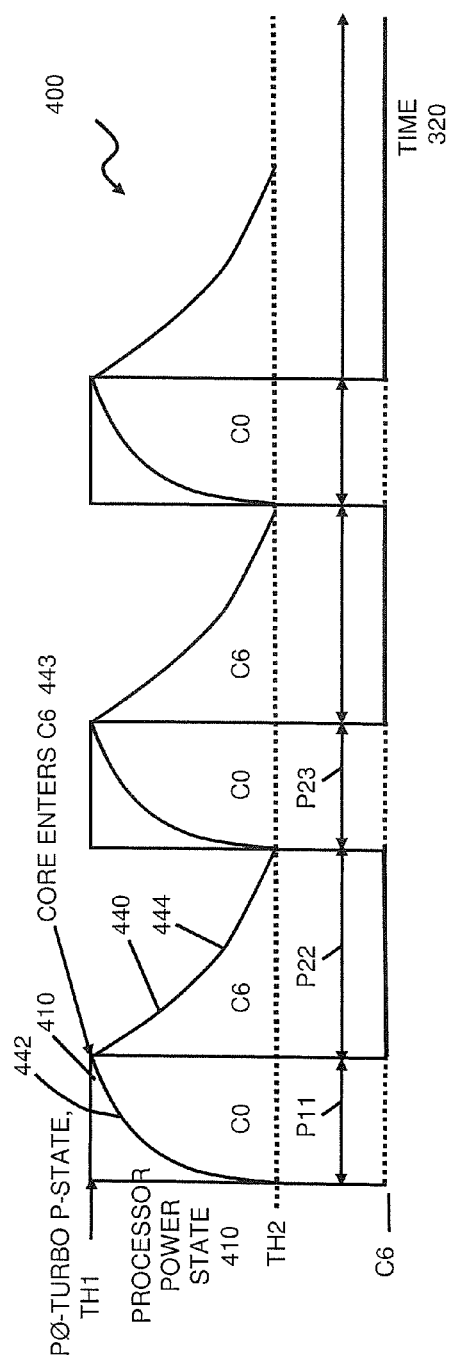
FIG. 4 is processor power state and temperature profile graph that may be used to implement thermal throttling of a processor using deep power down mode, according to some embodiments of the present invention.

FIG. 4 is processor power state and temperature profile graph that may be used to implement thermal throttling of a processor using deep power down mode, according to some embodiments of the present invention. FIG. 4 shows graph 400 plotting processor power state 410 and temperature profile 440 with respect to time 320. Temperature profile 440 may be a temperature of processor 102 or unit 110 as detected by sensor 120 and compared to thermal thresholds by unit 140.

At the beginning of time period P11, processor power state 410 is at P0 or a Turbo P-state (e.g., and the processor is at C0) and temperature profile 440 is at increasing curve 442. Period P11 may correspond to block 210 of FIG. 2 and represent that a processor (e.g., processor 102 or execution unit 110) is performing processing of data in an active processor power state. In some cases, Period P11 may represent any non-C6 state where the temperature of the processor is increasing, such as due to processing of data.

At the end of time period P11, temperature profile 440 has increased to (and is at or above) Threshold TH1. As a result, the processor (e.g., processor 102 or execution unit 110) may be put into deep down P-State C6. This is shown to occur at Core enters C6 443, which may correspond to block 230 of FIG. 2; and may represent that a processor (e.g., processor 102 or execution unit 110) is going to be put into a zero processor power state. In some cases, period P11 may represent any non-C6 state where the temperature of the processor is increasing, such as due to processing of data. In some embodiments period P11 may represent any non-C5 and non-C6 state where the temperature of the processor is increasing, such as due to processing of data.

During the C6 P-state the processor temperature is reduced to threshold TH2. FIG. 3 shows period P22 during which temperature profile 440 is at decreasing curve 444, until it decreases to (and is at or below) threshold TH2 at the end of period P22. This may correspond to block 250 of FIG. 2; and may represent that a processor (e.g., processor 102 or execution unit 110) is going to be put into an active processor power state. In some embodiments the C6 state described above in this paragraph may include the C5 and C6 states, such as where a zero processor power state includes the C5 and C6 states.

At the end of period P22, period P23 begins and the processor power state 410 and temperature profile 440 return to where they were at the beginning of period P11 and the plot repeats itself. Period P11-P22 may represent a period of time between 5 and 50 milliseconds. In some cases, period P11-P22 may represent a period of time between 10 and 30 milliseconds. In some cases, period P11-P22 may represent a period of time of 10 milliseconds. It is also considered that each of period P11 and period P22 may be a period of time of 10 milliseconds.

In some cases, threshold TH2 may be predetermined based on causing a time period of the zero processor power state to have a predetermined proportional relationship with a time period of the active or P0 processor power state. For example, the proportional relationship may be for the processor to be in the P0 state for 50 percent of time period P1-P22, and in the zero power state for 50 percent of time period P11-P22. It can be appreciated that other proportional relationship may be used. Also, the proportional relationship may be for the processor to be in the PO state for 50 milliseconds (e.g., period P11 is 50 milliseconds), and in the zero power state for 50 milliseconds (e.g., period P22 is 50 milliseconds).

Additional Descriptions of First and Second Thresholds

According to some embodiments, the first threshold (e.g., TH1) may be predetermined (e.g., predetermined during design of the processor) based on a thermal design of a computing device (e.g., see device 610 of FIG. 6) into which the processor and execution unit is installed. In some cases, the first threshold may be predetermined based on a desktop or mobile device design, maximum thermal threshold, above which continuing to run the processor of a device could negatively affect processor performance, damage processor components (e.g., the execution unit or other processor components) and/or can significantly reduce the life of a computing device battery (e.g., of a mobile device). In some cases, the first threshold may be predetermined based on a desktop or mobile device chassis design (e.g., see chassis 603) maximum desired thermal threshold, above which continuing to run the processor of a device could cause the user discomfort or injury. The processor temperature threshold that corresponds to the predetermined chassis temperature limit can be determined during design and test of the device. In some embodiments, the first threshold is selected based on a junction temperature upper design limit of the processor and a predetermined device chassis temperature upper threshold limit of a device into which the processor is installed (e.g., whichever threshold is lower).

For instance, the first threshold may be predetermined during design and testing of the processor to limit the on die temperature (e.g., at a Thermal "T" junction of unit 110) to no more than 80-85 degrees Celsius, or in some cases, to no more than 80, 100 or 105 degrees Celsius. Alternatively or in addition (e.g., whichever is lower), the first threshold may be predetermined during design and testing of the computing device which includes the processor (e.g., by the device original equipment manufacturer—OEM) to limit the chassis surface temperature (e.g., chassis bottom surface below the processor or where a user typically supports the device) to no more than 50-60 degrees Celsius. Thus, the first threshold may be selected so that the processor is placed into a lower power states to reduce temperature of the processor, and thus of computing device components and the device chassis.

In some cases, the second threshold (e.g., TH2) may be predetermined based on causing a time period of the zero processor power state to have a predetermined proportional relationship with a time period of the active processor power state. For example, the proportion of the relationship may be for the processor to be in the zero power state, then in the P0-state for 50 percent and for 50 percent of a time period (e.g., 50/50). I some cases, the proportion of the relationship may be to be in the zero power state, then in the P0 power state for 55/40 or 60/40 percent of a period of time. It can be appreciated that other proportional relationship may be used.

In some cases, the second threshold may be predetermined during design and testing of the processor to allow the power mode to return to an active mode when the on die temperature (e.g., at a Thermal "T" junction of unit 110) is below between 50-60 degrees Celsius. In some embodiments, the first and second thresholds are predetermined to maintain an on die temperature (e.g., at a Thermal "T" junction of unit 110) of between 30-90 degrees Celsius, and to allow the processor to be in active mode at least 30 percent of the time. In some cases, the second threshold may be predetermined to be between 50 and 85 percent of the first threshold.

In some embodiments, the power breakdown of a typical device (e.g., a processor or unit 110) is 40% leakage (e.g., leakage is the current when the unit is idle) and 60% active power. However, in cases with a smaller TDP (Thermal Design Point) form factors (e.g., for the processor or unit 110), there is usually lower leakage material (25% of total power). For these type of systems, the first and second thresholds will be different, such as by having a higher TH2, thus the active period P11 (or P23) will be increased leading to even higher performance.

Figure 5:
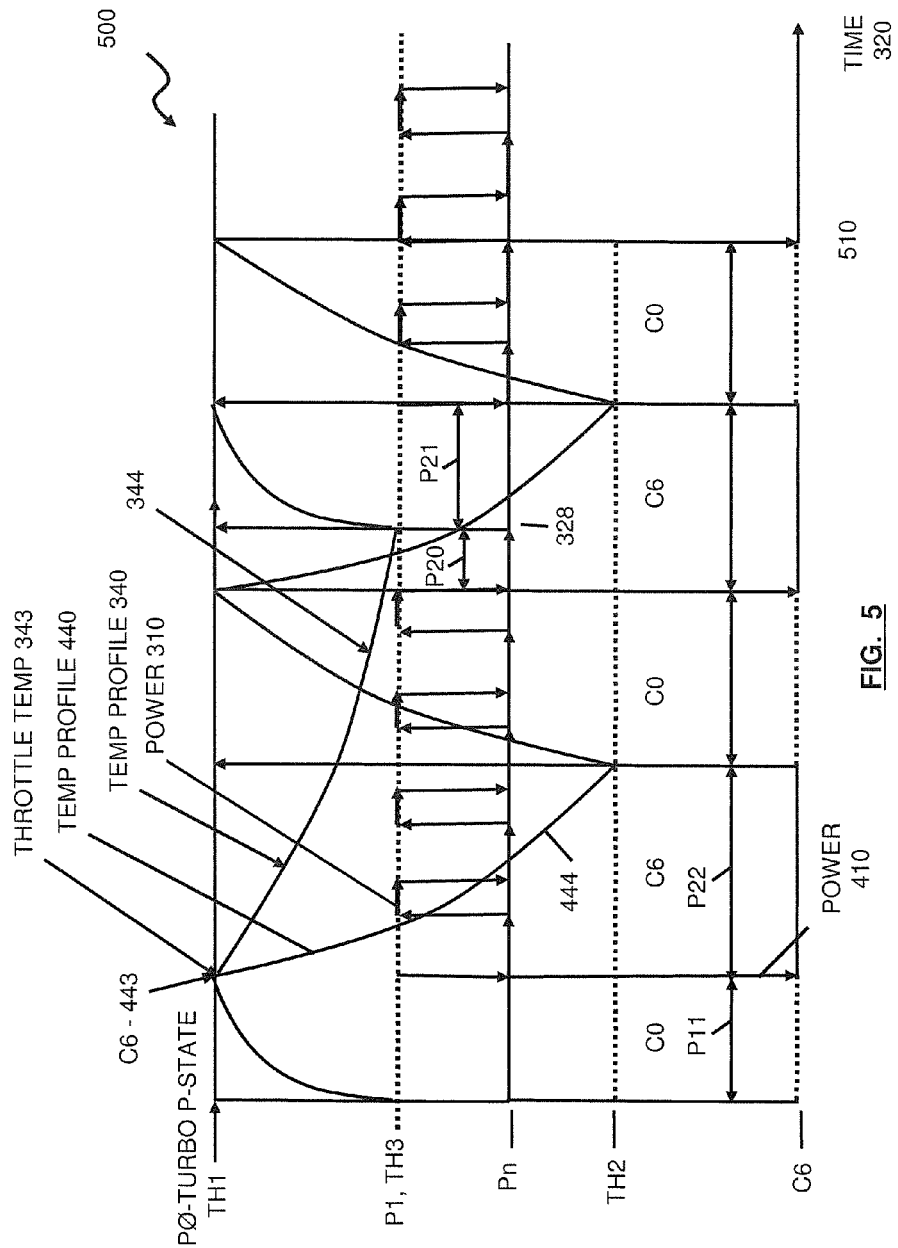
FIG. 5 is processor power state and temperature profile graph that compares the profiles of FIGS. 4 and 5, according to some embodiments of the present invention.

FIG. 5 is processor power state and temperature profile graph that compares the profiles of FIGS. 4 and 5, according to some embodiments of the present invention. FIG. 5 can be used to show that embodiments of FIG. 4 may be more efficient and power conserving than those of FIG. 3. FIG. 5 shows a limited embodiment representation of graphs 300 and 400 plotting processor power states 310 and 410; and temperature profiles 340 and 440 with respect to time 320. This representation is limited at least because, during time period P11, FIG. 5 shows temperature profiles 340 and 440 having the increasing curves; shows Throttle Temp 343 equal to threshold TH1; and shows threshold TH 2 below threshold TH3. It can be appreciated that neither of these equalities are necessary, but that the profiles and thresholds may be any appropriate profiles and thresholds, such as described herein.

During time period P11, FIG. 5 shows processor power states 310 and 410 at P0 Turbo P-state; and temperature profiles 340 and 440 at increasing curves. At the end of time period P11, the temperature profiles have increased to (and is at or above) Throttle Temp 343 or threshold TH1. However, after this point, it can be seen that power state 310 is put into a Throttle P-State 314, while power state 410 is put into deep down P-State C6. As a result temperature profile decreasing curve 344 decreases at a slower rate than decreasing curve 444 because the throttle P-states P1 and Pn are higher operating voltages and clock frequencies than the zero C6 state, and thus cause the processor to cool more slowly. In some embodiments the C6 state described above in this paragraph may include the C5 and C6 states, such as where a zero processor power state includes the C5 and C6 states.

Consequently, the decreasing curve 444 decreases to the TH2 threshold (at the end of period P22) faster than the decreasing curve 344 reaches the TH3 threshold (at point 328). Thus, power state 410 can be returned to PO state (at the end of period P22) earlier than power state 310 (at point 328). It can be appreciated that a benefit of changing power state 410 to deep down P-State C6 when temperature profile 440 has increased to above Threshold TH1, is a more energy efficient and power conserving cooling process because the processor cools more quickly and is able to operate at P0 state for longer overall period of time during time 320 (e.g., during the period from P11 to time 510). In some embodiments the C6 state described above in this paragraph may include the C5 and C6 states, such as where a zero processor power state includes the C5 and C6 states. In some cases, changing includes, as a result of the determining the processor voltage is above threshold TH1, turning off the processor, putting the processor in a zero voltage sleep state, or changing the processor operating voltage and clock frequency to zero.

According to embodiments, the voltage/frequency duty cycle of the throttle P-states of FIG. 3 are expensive from a performance point of view since it involves ratio/voltage changes and quiesing the complete core/uncore sub-system during the thermal event (e.g., processor temperature above threshold TH1. For example, using core C6 or C5-C6 states (embedded power gates) in the core, the core can be put in and out of deep power mode and form a duty cycle (e.g., periods P1/P22 of FIG. 4) that will help in the case of the thermal events. This allows each core of a multi-core processor (or a single core of a single core processor) to go into deep power down mode for a duty cycle to allow the cooling during the thermal event. Since this takes the core into a deeper power down state, the thermal event handling is done quicker and so it becomes a more efficient and conserving power/performance operating point.

Additional Descriptions of Processor Power States

In some embodiments, a voltage regulator (e.g., gates 130; or an on-die or off die voltage regulator) may provide a supply operating voltage to the processor (e.g., processor 102 or unit 110) and may be in accordance with a version of a smart-voltage regulation technology that actively reduces the total power dissipation in mobile processors, like the Intel Mobile Voltage Positioning (IMVP) specification, such as the IMVP-6 specification, for example.

For such embodiments, the voltage regulator (e.g., gates 130) is coupled to receive voltage identification (VID) signals from the processor (e.g., unit 140) over a bus (e.g., via line 144) and, responsive to the VID signals, provides an associated operating voltage to the processor over a signal line (or using gates 130). The voltage regulator (e.g., gates 130) may include voltage sleep logic that is responsive to one or more signals to reduce voltage to the processor to a zero state (e.g., C6 or C5-C6 state) and then ramp the voltage to the processor back up again after exiting the zero voltage sleep state (e.g., to an active state). In some cases, the sleep logic may reside in unit 140, which sends a zero state and then ramp up voltage instructions to gates 130 (e.g., via line 144).

For other embodiments of the invention, a different type of voltage regulator may be used, including a voltage regulator in accordance with a different specification. Further, for some embodiments, the voltage regulator may be integrated with another component of the computing device including the processor. It should be appreciated that the voltage regulator may (e.g., gates 130 as shown in FIG. 1 or another design having the regulator on the die) or may not be integrated with the processor dependent upon design considerations.

According to some embodiments of the invention, assertion of the control signal (e.g., via line 144) to a zero power state may further cause the internal VID target (e.g., internal to gates 130 or to unit 140) to be set to a zero voltage level, resulting in a zero operational voltage being applied to the processor (e.g., processor 102 or unit 110) by the voltage regulator, such that the processor transitions into a very deep sleep state that has very low power consumption characteristics.

According to some embodiments of the invention, an integrated circuit such as processor 102 (e.g., unit 140), for example, may initiate a transition to a zero voltage power management state. In one example, processor 102 may be a central processing unit (CPU). Further, the zero voltage management state may be, for example, a deeper sleep state in accordance with ACPI standards. During this transition, the state of the processor may be saved. For example, state variables associated with the processor (e.g., the processor's current or most recent processing state) may be saved in a dedicated cache memory (e.g., synchronous random access memory—SRAM).

The operating voltage of the processor may be subsequently reduced to zero such that the processor is in a very deep sleep state that has very low power consumption characteristics. Particularly, the voltage regulator utilizing optional zero voltage sleep state logic may reduce the operating voltage and clock frequency down to zero. As previously discussed, this may be done in conjunction with zero voltage entry/exit logic of clock/power management logic of processor (e.g., unit 140). In some embodiments, this zero voltage power management state, when implemented in conjunction with ACPI standards, may be referred to as the C6 or C5-C6 state.

Subsequently, in response to receiving a request to exit the zero voltage power management state, the processor may exit the zero voltage power management state at a higher reference operating voltage. Particularly, under the control of zero voltage entry/exit logic of the processor (e.g., unit 140) and zero voltage sleep logic of the voltage regulator, as previously described, a voltage regulator may raise the reference operating voltage to a suitable level such that the processor may operate properly. The critical state variables of processor are then restored to the processor or execution unit, from the dedicated cache memory.

Advantageously, because the processor does the majority of C-state coordination in hardware, software can independently request to enter the zero voltage processor sleep state (e.g. C6 or C5-C6) in each core of a multi-core processor (or a single core of a single core processor) without any software coordination with the other core. More particularly, by utilizing the zero voltage processor sleep state (e.g. C6 or C5-C6) the power required by the processor in the sleep state is reduced virtually to zero.

Figure 6:
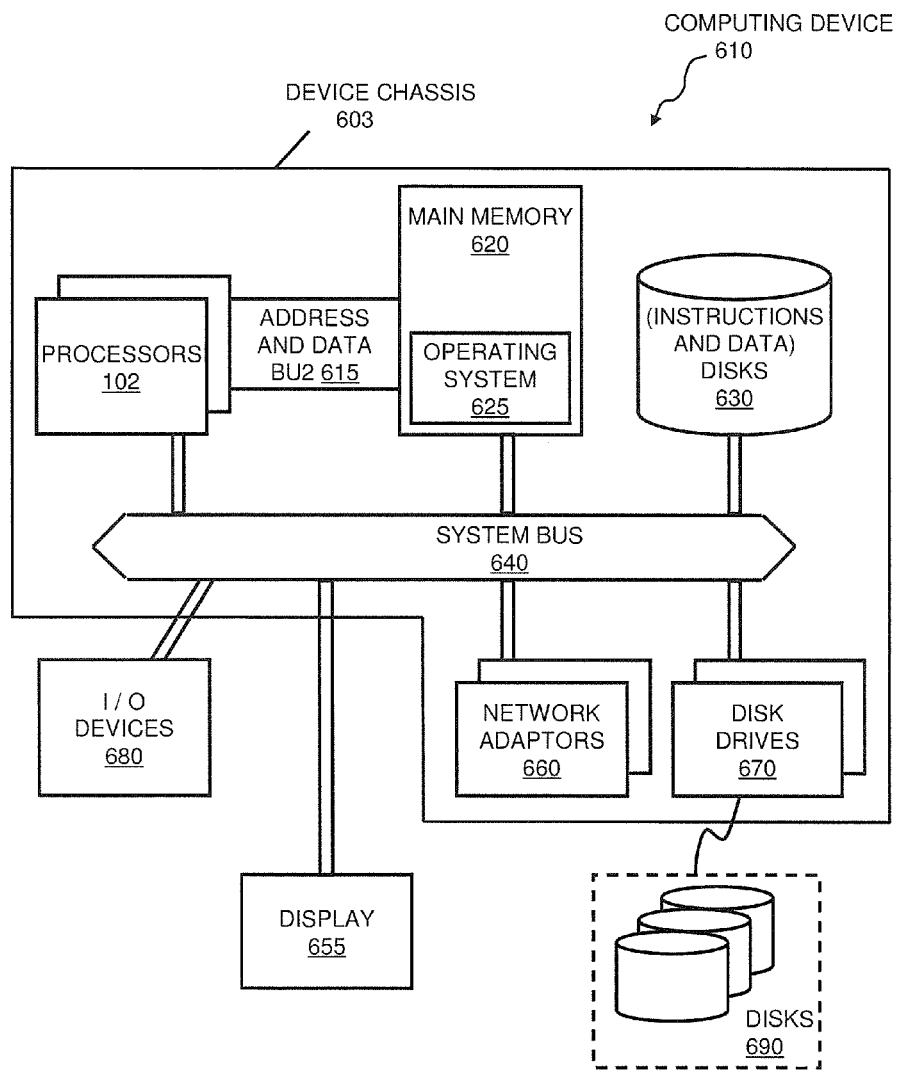
FIG. 6 is a block diagram of a computing device that may be used to implement energy efficient thermal throttling of a processor using deep power down mode, according to some embodiments of the present invention.

FIG. 6 is a block diagram of a computing device that may be used to implement energy efficient thermal throttling of a processor using deep power down mode, according to some embodiments of the present invention. FIG. 6 shows computing device 610 including processor 102 (e.g., die 104), memory 620 having operating system 625, and bus 615, all housed or installed in device chassis 603. Chassis 603 may be a 65-95 Watt chassis (e.g., as determined by the OEM).

Processor 102 is coupled to memory 620 via bus 615 to process data stored in the memory. Processor 102 is also coupled to disks 630, network adaptors 660, disk drives 670, I/O devices 680 and display 655 by system bus 640. Disks 630, adaptors 660, disk drives 670 and bus 640 may also be housed or installed in device chassis 603. Buses 615 and 640 may communicate signals between the coupled components, using protocols, as known in the art. Certain standard well-known components, which are not germane to embodiments of the invention, may not be shown.

Bus 640, may be an abstraction that represents any one or more separated physical buses and/or point-to-point connections, connected by appropriate bridges, adapters and/or controllers. Bus 640, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire"). In some cases, bus 640, is a host bus, such as a bus to interface a host (e.g., processors 102) to peripheral devices (e.g., disks 630). I/O devices 680 may include a keyboard and/or mouse interface. Bus 640 is interfaced to display 655 as known in the art.

Processors 102 may be the central processing units (CPUs), and, thus control and coordinate the overall operation of device 610. Processors 102 may accomplish this by executing software, such as the operating system, middleware programs, and applications stored in memory 620.

Processors 102 may represent one or more processors or execution cores, as known in the art. Each such processor or core may be thermally controlled by a single unit 140 as described herein. In some cases, multiple processors or cores may be thermally controlled by a single unit 140 as described herein. For example, multiple sensors 120 may be coupled to the multiple processors or cores, and unit 140 may thermally control to the multiple processors or cores independently (e.g., sending different control signals for active or zero power state based on each sensor output is above/below the thresholds) or in unison (e.g., sending the same control signals for active or zero power state to each processor based on whether one or more of all the combined sensor outputs is above/below the thresholds).

Memory 620 may be or include the "main memory" of device 610. Memory 620 represents any form of random access memory (RAM), read-only memory (ROM), flash memory, or the like, or a combination of such devices. The operating system, middleware programs, and/or applications stored in memory 620 may be (e.g., the "software" or machine programmable instructions) as noted herein. Processor 102 has direct access to main memory 620 via an address and data bus 615. Address and data bus 615 may be an address and data bus as known in the art.

Network adapters 660 provide device 610 with the ability to communicate with remote devices, such as remote computers, over a network (e.g., wired or wireless networks) and may be, for example, an Ethernet adapter or Fiber Channel adapter. Network adapters 660 provide device 610 with the ability to communicate with clients or server computers, such as over a local area network (LAN), intranet, the Internet, or various other networks over which data is communicated using wired optical, wireless, acoustical, electromagnetic radiation, or other medium as known in the art.

Disk 630 may contain other instructions and data that are not immediately required by the system in its operations. Disk drives 670 may be one or more devices that allow the computer to access memory or storage disks 150. Disk drives 670 may include a magnetic disk drive, a CD drive, a DVD driver, a USB port or other removable memory interface as known in the art to allow the computer to access memory or storage disks 690.

According to some embodiments, it is contemplated that device 610 may represent a computing device, such as a general purpose computing device and/or special purpose computing device, a desktop computer, a portable computing device, a handheld computing device, a telephone, a cellular telephone, a gaming device, an internet related computing device, a digital video disk (DVD) player, a set top box, etc., and/or another device or system that includes and uses processor 102 to process data.

In some cases, the components of processor 102 (e.g., unit 140) includes hardware logic, hardware, processors, machine executable code, memory, integrated circuits, programmable gate arrays, controllers, buffers, state machines, FPGAs, PLDs, active devices (e.g., transistors, etc.), passive devices (e.g., inductors, capacitors, resistors, etc.), and/or other circuit elements to perform energy efficient and power conserving thermal throttling of a processor using deep power down mode, according to embodiments of the present invention.

Exemplary Register Architecture

FIG. 7 is a block diagram of a register architecture 700 according to one embodiment of the invention. In the embodiment illustrated, there are 32 vector registers 710 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 715—in the embodiment illustrated, there are 8 write mask registers (k0 through k7), each 64 bits in size. In an alternate embodiment, the write mask registers 715 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 745, on which is aliased the MMX packed integer flat register file 750—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and Out-of-order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON)

of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-order Core Architecture

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor With Integrated Memory Controller and Graphics

Figure 10:
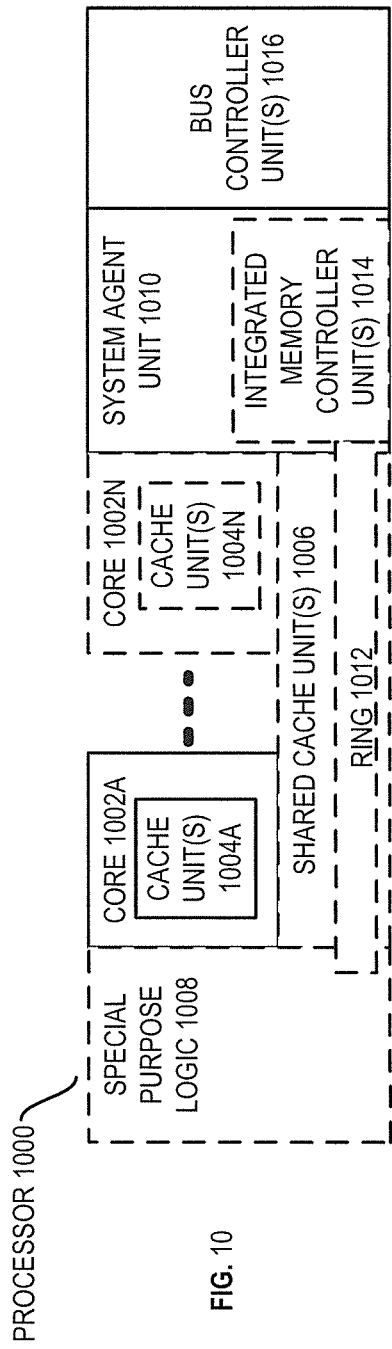
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
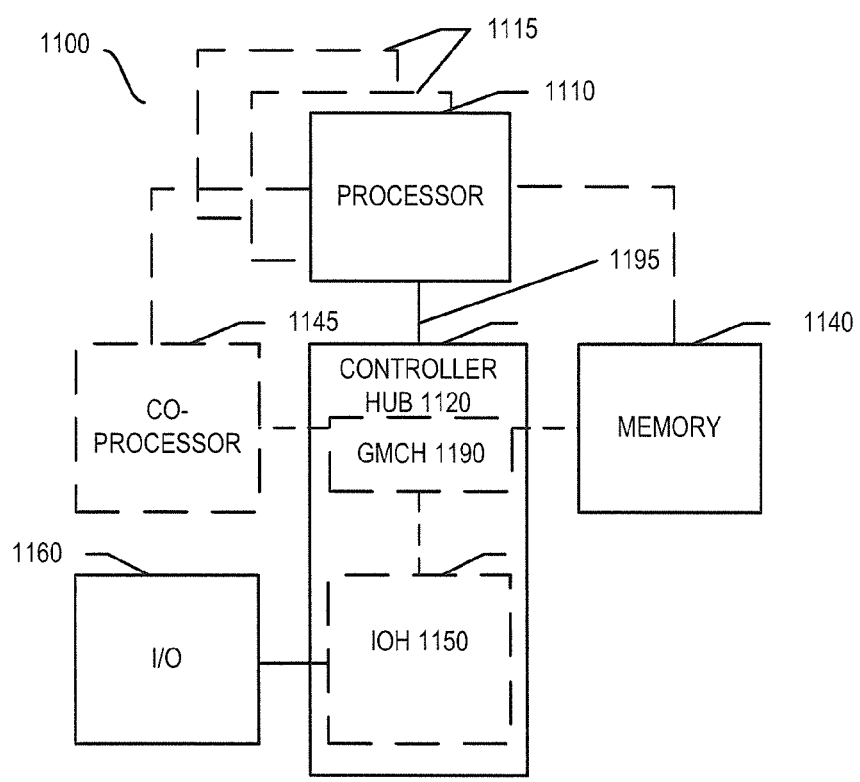
FIG. 11 shows a block diagram of a system in accordance with one embodiment of the present invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
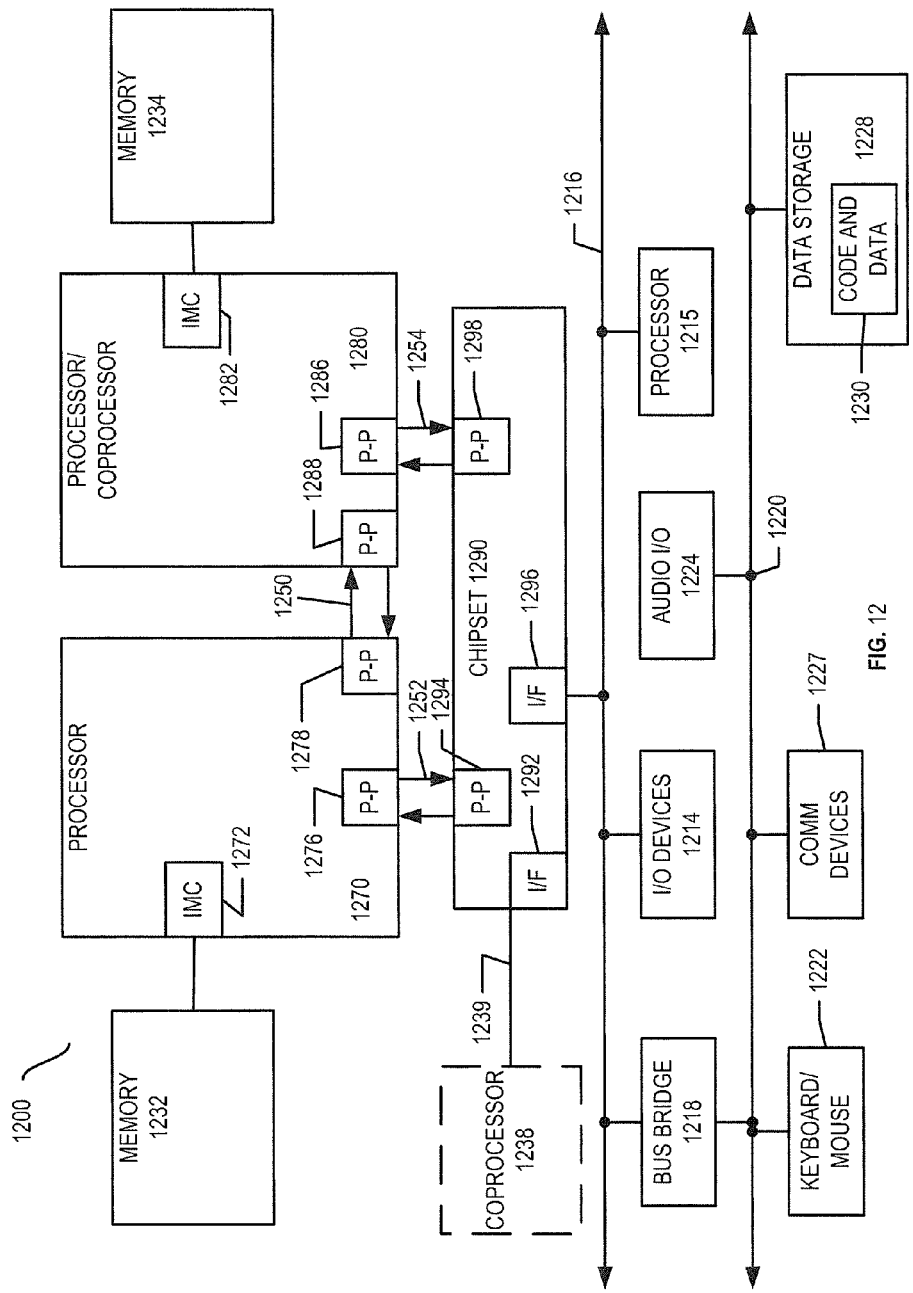
FIG. 12 shows a block diagram of a first more specific exemplary system in accordance with an embodiment of the present invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
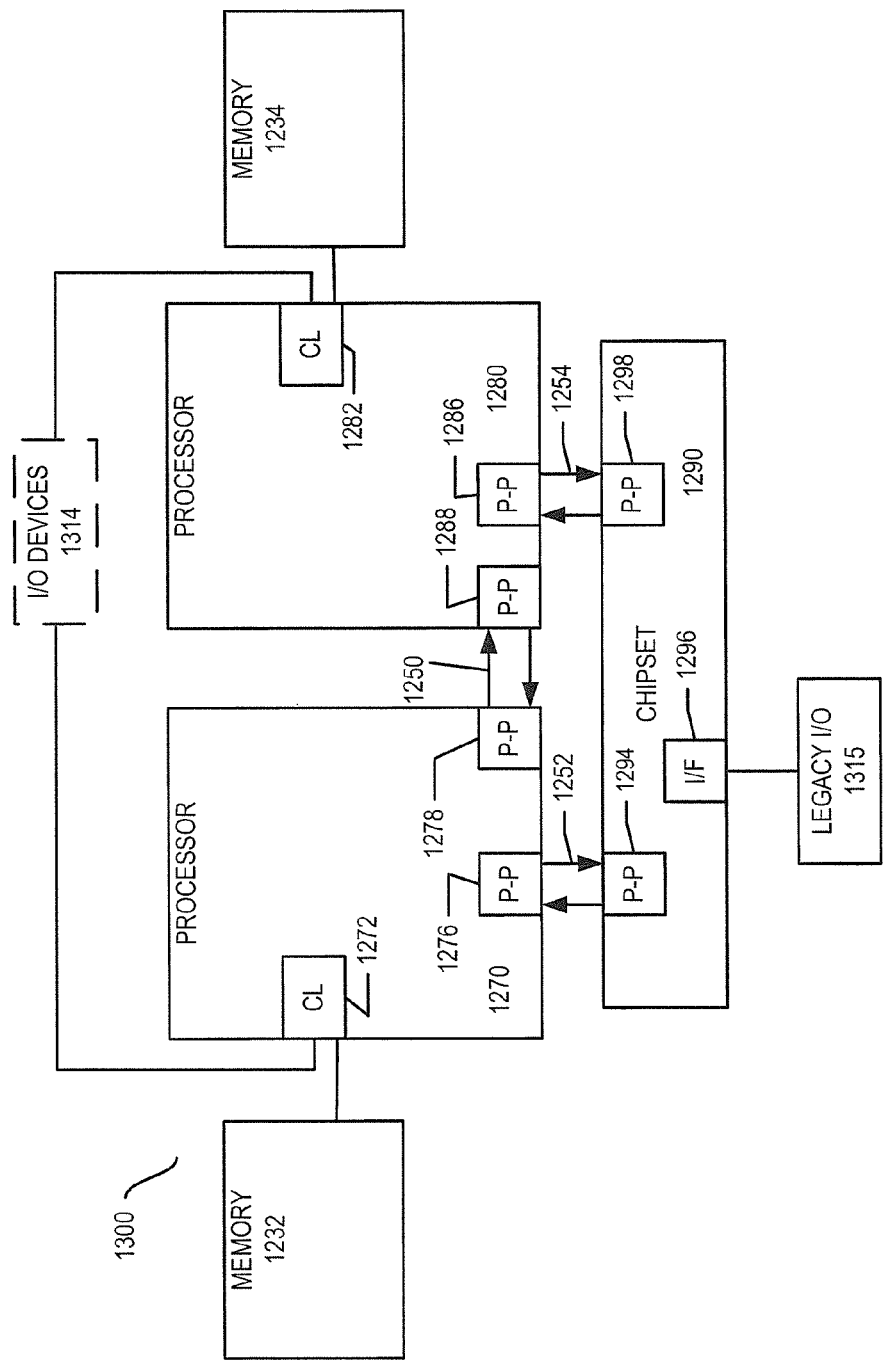
FIG. 13 shows a block diagram of a second more specific exemplary system in accordance with an embodiment of the present invention.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
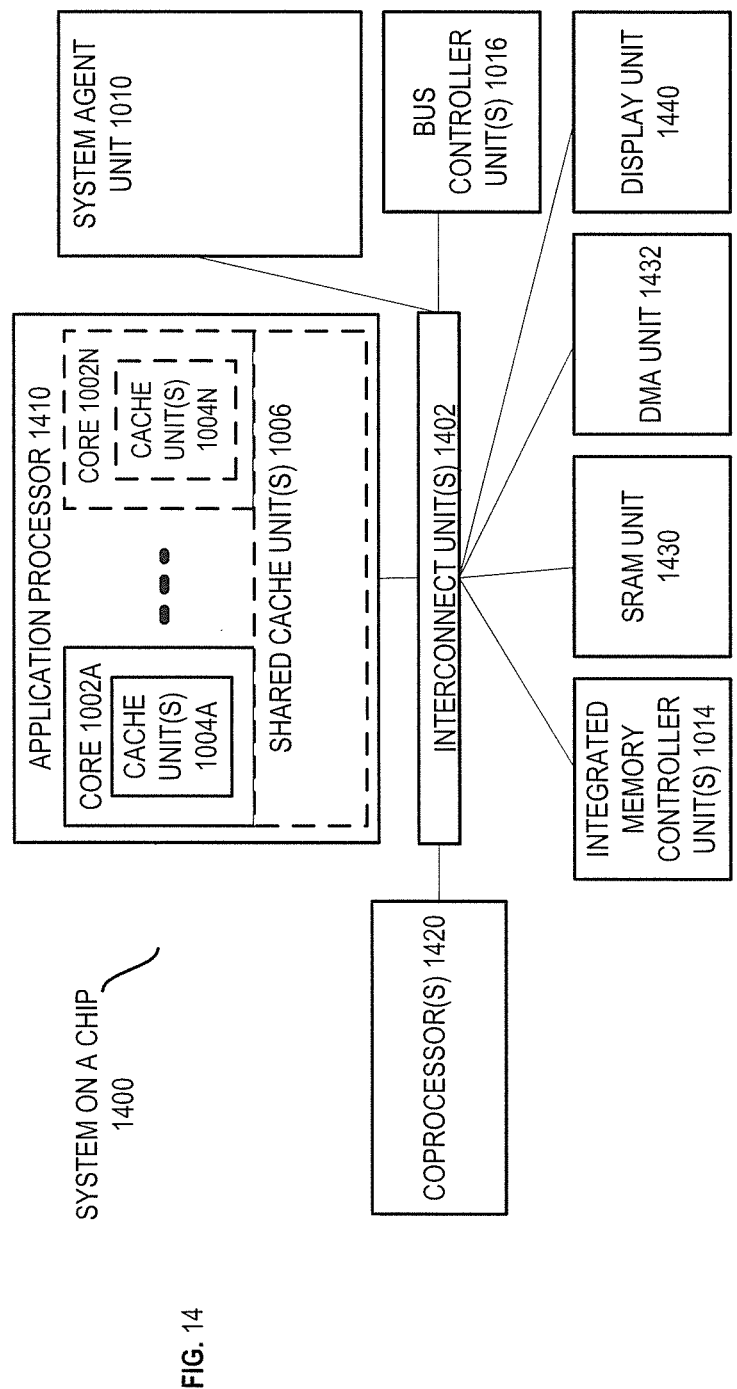
FIG. 14 shows a block diagram of a SoC in accordance with an embodiment of the present invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphine, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

It will be appreciated that, while exemplary embodiments have been described in reference to energy efficient and power conserving thermal throttling of a processor using deep power down mode, that various embodiments may be applied to different types of thermal management configurations and/or for different types of integrated circuits. Further, although voltage control is accomplished using signal 144 (and/or VID) signals for the exemplary embodiments described herein, other approaches to providing voltage control are within the scope of various embodiments.

Thus, various embodiments of a method and apparatus for energy efficient and power conserving thermal throttling of a processor using deep power down mode are described. In the foregoing specification, embodiments of the invention have been described with reference to specific exemplary embodiments thereof. It will, however, be appreciated that various modifications and changes may be made thereto without departing from the broader spirit and scope of embodiments of the invention as set forth in the appended claims. Thus, the specification and drawings are, accordingly, to be regarded in an illustrative rather than a restrictive sense.

What is claimed is:

1. A method comprising:
    detecting that a temperature of a processor is greater than a first threshold, while the processor is performing processing of data in an active processor power state;
    based on detecting, changing a processor power state of the processor from the active processor power state to a zero processor power state by power gating the processor;
    after changing a processor power state of the processor from an active processor power state to the zero processor power state, then detecting that a temperature of the processor is less than a second threshold, wherein the second threshold is less than the first threshold; and
    based on detecting that the temperature of the processor is less than the second threshold, changing the processor power state from the zero processor power state to an active processor power state to cause the processor to process data, wherein the first threshold is based on a thermal design of a device into which the processor is installed; and wherein the second threshold is based on causing a time period of the zero processor power state to have a proportional relationship with a time period of the active processor power state.

2. The method of claim 1, wherein changing comprises one of turning off the processor, putting the processor in a zero voltage sleep state, and changing the processor operating voltage and clock frequency to zero.

3. The method of claim 1, wherein detecting that the temperature of the processor is greater than a first threshold, further comprises:
    detecting a temperature of the processor over a period of time using a thermal sensor attached to the processor;
    determining, based on the thermal sensor reading, that the temperature of the processor has increased to greater than the first threshold.

4. The method of claim 1, wherein the active processor power state is one of a non-zero power state, and a processor power state equal to or above a thermal design point of the processor.

5. An apparatus comprising:
    a processor die comprising an execution unit coupled to a thermal sensor and to a power control unit, wherein the thermal sensor is coupled to the power control unit;
    the thermal sensor to detect that a temperature of the execution unit has increased to greater than a first threshold, while the execution unit is performing processing of data in an active processor power state;
    the power control unit to, based on detecting, change a processor power state of the execution unit from the active processor power state to a zero processor power state by power gating,
    wherein the thermal sensor to, after changing the processor power state from the active processor power state to the zero processor power state, subsequently detect that a temperature of the execution unit has decreased to less than a second threshold, wherein the second threshold is lower than the first threshold;
    the power control unit to, based on detecting that the temperature of the execution unit is less than the second threshold, change the processor power state from the zero processor power state to an active processor power state to cause the execution unit to process data, wherein the first threshold is based on a thermal design of a device into which the execution unit is installed; and wherein the second threshold is based on causing a time period of the zero processor power state to have a proportional relationship with a time period of the active processor power state.

6. The apparatus of claim 5, wherein to change comprises one of turning off the processor, to put the processor in a zero voltage sleep state, and change the processor operating voltage and clock frequency to zero.

7. The apparatus of claim 5, wherein the power control unit is further to:
    detect a temperature of the execution unit over a period of time using the thermal sensor;
    turn off the execution unit when it is determined that the temperature of the execution unit has increased to greater than the first threshold.

8. The apparatus of claim 5, wherein the active processor power state is one of a non-zero power state, and a processor power state equal to or above a thermal design point of the execution unit.

9. A system comprising:
    a computing device having a chassis and a processor die and memory installed in the chassis; the processor die coupled to the memory to process data stored in the memory;
    the processor die comprising an execution unit coupled to a thermal sensor and to a power control unit; wherein the thermal sensor is coupled to the power control unit;
    the thermal sensor to detect that a temperature of the execution unit has increased to greater than a first threshold, while the execution unit is performing processing of data in an active processor power state;
    the power control unit to, based on detecting, change a processor power state of the execution unit from the active processor power state to a zero processor power state by power gating, wherein the thermal sensor to, after changing the processor power state from the active processor power state to the zero processor power state, subsequently detect that a temperature of the execution unit has decreased to less than a second threshold, wherein the second threshold is lower than the first threshold;

the power control unit to, based on detecting that the temperature of the execution unit is less than the second threshold, change the processor power state from the zero processor power state to an active processor power state to cause the execution unit to process data and wherein the first threshold is based on a thermal design of the computing device and the second threshold is based on causing a time period of the zero processor power state to be equal to a time period of the active processor power state.

10. The system of claim 9, wherein to change comprises one of turning off the processor, to put the processor in a zero voltage sleep state, and change the processor operating voltage and clock frequency to zero.

11. The system of claim 9, wherein the power control unit is further to:
  detect a temperature of the execution unit over a period of time using the thermal sensor;
  turn off the execution unit when it is determined that the temperature of the execution unit has increased to greater than the first threshold.

\* \* \* \* \*